United States Patent [19]

Wolpers et al.

[11] Patent Number: 5,342,900

[45] Date of Patent: Aug. 30, 1994

[54] PROCESS FOR THE PREPARATION OF DIENE RUBBER VULCANIZATES

[75] Inventors: Jürgen Wolpers, Haltern; Dieter Zerpner; Karl-Heinz Nordsiek, both of Marl, all of Fed. Rep. of Germany

[73] Assignee: Huls Aktiengesellschaft, Marl, Fed. Rep. of Germany

[21] Appl. No.: 937,109

[22] Filed: Aug. 31, 1992

[30] Foreign Application Priority Data

Aug. 30, 1991 [DE] Fed. Rep. of Germany ....... 4128869
Aug. 4, 1992 [DE] Fed. Rep. of Germany ....... 4225684

[51] Int. Cl.$^5$ ...................... C08C 19/22; C08C 19/20
[52] U.S. Cl. ............... 525/329.3; 525/332.7; 525/352
[58] Field of Search ............ 525/329.3, 332.7

[56] References Cited

U.S. PATENT DOCUMENTS 3,869,435 3/1975 Trivette, Jr. ...................... 525/349

Primary Examiner—Christopher Henderson
Attorney, Agent, or Firm—Oblon, Spivak, McClelland, Maier & Neustadt

[57] ABSTRACT

Vulcanization of diene rubbers at a temperature of from 140° to 200° C. in the presence of 1 to 4.5 parts of a crosslinker having the formula

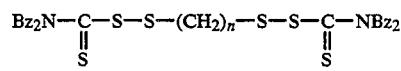

wherein n denotes 2 or 6 and Bz denotes benzyl, in the simultaneous presence of a very small amount of sulfur and a small amount of a mercapto or sulfenamide accelerator or mixtures thereof affords elastomers having a previously unachieved outstanding ageing stability and reversion stability, after relatively short vulcanization times using economical amounts of chemicals while avoiding blooming phenomena in the vulcanizate.

6 Claims, No Drawings

PROCESS FOR THE PREPARATION OF DIENE RUBBER VULCANIZATES

BACKGROUND OF THE INVENTION

1. Field of the Invention

The present invention relates to a process for the preparation of diene rubber vulcanizates and the vulcanized rubbers afforded by such a process.

2. Discussion of the Background

Diene rubbers are amongst the most frequently used all-purpose rubbers. The term diene rubbers is understood as meaning polymers and copolymers of butadiene, styrene and also isoprene. Natural rubber and synthetic polyisoprene are also to be regarded as diene rubbers. These rubbers are inexpensive and available in large amounts and have good general properties. A disadvantage of this group of rubbers is a structure-related limitation of inadequate aerobic and anaerobic ageing resistance and heat stability of their sulfur vulcanizates.

Anaerobic ageing is understood as meaning the behavior of the vulcanizate with the exclusion of air, including, for example, in the heating mold, where prolonged reaction times cause so-called reversion in many diene rubbers. This understood as meaning the decrease in important material properties, such as tensile strength, elongation at break, modulus and dynamic properties when the mixture is heated for longer than the optimum period of time. The phenomenon of reversion can be observed most simply with the aid of a so-called vulcameter curve in accordance with DIN 53 529.

Aerobic ageing, on the other hand, includes all processes of natural ageing in the presence of atmospheric oxygen, including at elevated temperatures, such as, for example, on vehicle tires under operating conditions.

The deficiencies described in aerobic and anaerobic ageing are particularly pronounced in natural rubber and polyisoprene.

In order to compensate, at least partly, for this disadvantage, in addition to using antioxidants, a number of alternative vulcanization recipes have been used. These include so-called sulfur donors, such as tetramethylthiuram disulfide (TMTD), dimorpholine disulfide (DTDM) and similar compounds, or so-called EV systems which use the sulfur employed more efficiently by employing a larger amount of accelerator at a lower sulfur dosage. With these vulcanization systems, however, the processing reliability is often impaired because of the shorter partial vulcanization time. The vulcanizates produced with EV systems also have various disadvantages, including, in particular, their increased susceptibility to fatigue under continuous dynamic stress. When TMTD and generally low molecular weight dithiocarbamates are employed, there is moreover the risk of the formation of a considerable amount of carcinogenic nitrosamines. Above all, however, the improvements which can be achieved in ageing stability are not yet convincing, but still mainly leave something to be desired.

Another way of improving the heat stability of diene rubber vulcanizates has been proposed in EP-OS 0 385 072 and 0 432 417. In this procedure, compounds which contain the customary radicals which accelerate sulfur vulcanization and have the general structure

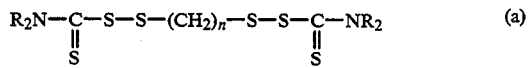

where R=ethyl and n=2 (EP-OS 0 385 072), called BDTE below, and
where R=benzyl and n=2 (EP-OS 0 432 417) called BDBzTE below,
and where n=6, called BDBzTH below (EP-OS 0 432 417) are employed as the sole crosslinking agents.

The examples demonstrate that, for example, vulcanizates having a very good ageing stability are obtained with 4.5 parts of BDTE or 7 parts of BDBzTE per 100 parts of rubber. BDBzTH with a longer network bridge is also used as a comparison example (EP-OS 0 432 417, Table 1a, Examples 1a and Da). However, the disadvantages of the system are also not to be left unmentioned:

a) BDTE is susceptible to the formation of hazardous nitrosamines.
b) The vulcanization reaction proceeds considerably more slowly with the crosslinking agents BDBzTE and BDBzTH ($t_{90}$ values of 29 minutes and 34.3 minutes), so that uneconomically long vulcanization times of 40 minutes or more are required at 150° C.
c) Because of the high molecular weight of BDBzTE and BDBzTH, at least 7 parts must be employed per 100 parts of rubber in order to achieve useful vulcanizate properties, which represents an economic burden on the process according to EP-OS 0 385 072 and 0 432 472.

Where such large amounts of chemicals are used, there is furthermore the risk that the secondary products formed in the course of the vulcanization are no longer adequately soluble in the elastomer, but lead to undesirable efflorescence phenomena.

In both the patent documents mentioned, attention is drawn expressly to the adverse effect generally of sulfur additions in respect of the stability of the vulcanizate to reversion.

The above-mentioned European patent applications thus provide no indication at all as to how diene rubber vulcanizates of outstanding ageing stability can be obtained with economically and industrially acceptable amounts of crosslinker substances over acceptable vulcanization times.

The two DE-PSS 22 65 382 and 22 56 511 relate very generally to the compounds of the general formula

wherein the radicals A and A' represent a large number of accelerator radicals, inter alia including N-substituted thiocarbamoyl radicals, and R represents almost any divalent organic radical. This results in an exceptionally wide selection of substances, of which some are employed in the examples. These also include an analogous substance according to the general formula (a) where R=methyl and n=2, called BDMTE below. In DE-PS 22 65 382, this is also employed together with sulfur (column 31/32, Table VII), but the experiments show that even small amounts of sulfur (0.3 to 1%) lead to undesirable reversion phenomena. It is expressly admitted that batches without addition of sulfur have a higher capacity for resistance to reversion (column 32, lines 1–11).

BDMTE and BDTE are employed as crosslinker substances in DE-PS 22 56 511. This specification refers to the insufficient crosslinking density of the vulcanizates as a disadvantage (column 21, lines 12 to 27), which can be compensated by additions of 0.5–1.5 parts of sulfur, although the penalty again is an increased susceptibility of the rubber mixtures to reversion.

Generally, a criticism of the prior art last mentioned is that the absence of reversion phenomena in the rheometer test is used as the sole criterion of heat stability. However, as stated above, rheometer testing at best provides some information on anaerobic ageing—but even this is only incomplete, since the rheometer curve merely provides information on the torque of the vulcanizate. No data are given in DE-PSS 22 65 382 and 22 56 511 on the aerobic ageing resistance, which gives much more relevant indications of the resistance of the vulcanizate when used in practice. This information is preferably obtained by storage of vulcanizate samples in a circulating air cabinet under continuous exposure to a temperature of 100° C. over a period of 3, 7 or 14 days (in accordance with DIN 53 508). After this time has elapsed, which represents exceptionally severe exposure conditions for natural rubber, cis-polyisoprene, cis-polybutadiene and blends thereof, all the relevant elastomer properties are measured, such as tensile strength, elongation at break, modulus, hardness and rebound resilience, and if appropriate also the dynamic properties and the abrasion resistance. A comprehensive insight into the resistance of the elastomer to thermal ageing is thus obtained.

Thus, there remains a need for a process for obtaining, under appropriate conditions, heat- and ageing-stable vulcanizates of diene rubbers under practical use conditions.

SUMMARY OF THE INVENTION

Accordingly, it is one object of the present invention to provide a novel process for preparing diene rubber vulcanizates which exhibit excellent resistance to anaerobic and aerobic aging.

It is another object of the present invention to provide a novel method for preparing diene vulcanizates which is economical with respect to both chemicals and time.

It is another object of the present invention to provide vulcanized diene rubbers which are prepared by such a process.

It is another object of the present invention to provide a heat-resistant, that is to say a both reversion-resistant and in particular ageing-stable crosslinking system for natural rubber and synthetic diene rubbers which avoids the disadvantages of the known systems.

In detail, this means:
1. A vulcanization rate similar to conventional sulfur-/accelerator systems.
2. A crosslinking yield, measured by the vulcanizate properties such as tensile strength, modulus and compression set, similar to conventional sulfur/accelerator systems.
3. A high resistance to reversion, that is to say anaerobic ageing resistance.
4. An outstanding aerobic ageing resistance of the vulcanizates.
5. A reduction in the amount of crosslinking agent used for technical reasons (risk of blooming) and also for economic reasons.

These and other objects, which will become apparent during the following detailed description, have been achieved, surprisingly, by employing crosslinking agents having the formula

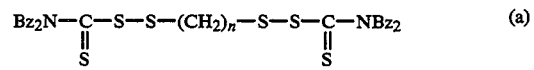

where
Bz=benzyl and n=2 (BDBzTE) or
n=6 (BDBzTH),
with the simultaneous use of very small, almost catalytic amounts of sulfur and in addition a small amount of a mercapto or sulfenamide accelerator, or mixtures thereof, as the vulcanization system. The additional accelerator is used here for fine adjustment in controlling the vulcanization kinetics.

DETAILED DESCRIPTION OF THE PREFERRED EMBODIMENTS

Under the preconditions now found, the amount of crosslinking agents BDBzTE or BDBzTH employed in the vulcanization of diene rubbers, such as natural rubber (NR), cis-polyisoprene (cis-IR), cis-polybutadiene (cis-BR), styrene-butadiene rubber (SBR) or blends thereof, can be reduced to 1 to 4.5 parts, preferably 2 to 4 parts, per 100 parts of rubber if simultaneously 0.05 to 0.3 part of sulphur, preferably 0.1 to 0.2 part, and 1 to 2.5 parts, preferably 1.3 to 1.8 parts, of a mercapto accelerator or 0.2 to 0.8 part, preferably 0.3 to 0.5 part, of a sulfenamide accelerator are employed, without the slightest curtailments having to be made in the mechanical properties after aging compared with vulcanizates obtained from slow crosslinking with 6 to 7 parts of these crosslinking agents alone.

However, mixtures with 0.3 to 2.5 parts, particularly preferably 0.6 to 1.5 parts, of mercapto accelerator and 0.1 to 0.8 part, particularly preferably 0.2 to 0.6 part, of sulfenamide accelerator, in addition to the quantities of crosslinking agent and sulphur indicated above, are preferred.

The preferred accelerators used are zinc 2-mercaptobenzothiozole (ZMBT), dibenzothiazyl disulphide (MBTS) and N-tert-butyl-2-benzothiazyl-sulfenamide (TBBS), but it is quite possible within the scope of the invention to use other mercapto accelerators or sulfenamide accelerators.

The values found show that, compared with sole use of the crosslinking agents, significant improvements are even to be achieved. This result was in no way to be expected in view of the known adverse influence of sulphur on the reversion and aging properties of elastomers.

Suitable diene rubbers are natural rubber, cis-polyisoprene, cis-polybutadiene and also conventional SBR, which can have been prepared by either solution or emulsion processes. Vinyl-polybutadiene and vinyl-SBR are suitable in the same way. It is also possible to use nitrile rubber and polyoctenamers (TOR). Equally good results are also obtained with blends of these polymers with one another. In addition, these rubbers can be used in the oil-free or oil-extended state.

The types of rubber listed are vulcanized in compounds of the usual composition, that is to say in mixtures which contain fillers, such as carbon blacks or silica, oils, rubber auxiliaries, zinc oxide, stearic acid, antioxidants and if appropriate ozone stabilizers in the customary amounts. However, it is not necessary to use the antioxidants mentioned (ASM) to obtain the action of the systems according to the invention. The system according to the invention also provides vulcanizates which have a considerably higher stability to aging without ASM as ASM in a conventional system. The rubber mixtures are prepared in the customary manner in internal mixers (kneaders), and if appropriate also on roll mills.

The preparation of the crosslinker substances is described in detail in EP-OSS 0 385 072 and EP-A 0 432 417, which are incorporated herein by reference.

The vulcanization of the finished mixtures can be carried out at the customary temperatures, that is to say at 140°–200° C., preferably 145° to 190° C., for a time sufficient to obtain the vulcanizate. The advantage of the system according to the invention is that vulcanization can be carried out at higher temperatures without reversion phenomena with the known adverse effects on the vulcanizate properties becoming noticeable. Rubber articles are obtained which have an outstanding ageing resistance and are of great importance for various fields of use, such as, for example, for vehicle tires, industrial elastomer articles, such as engine bearings and many other applications at elevated temperatures.

Accelerators based on triazine are in principle also possible, in addition to the above-mentioned particularly preferred accelerators. Additional examples of mercapto and sulfenamide accelerators as well as other accelerators are disclosed in *Kirk-Othmer, Encyclopedia of Chemical Technology*, 3rd ed., vol. 20, Wiley, N.Y., pp. 337–348 (1982), which is incorporated herein by reference.

Having generally described this invention, a further understanding can be obtained by reference to certain specific examples which are provided herein for purposes of illustration only and are not intended to be limiting unless otherwise specified.

EXAMPLES

The advantages of the crosslinking systems according to the invention can be seen from the following examples. The properties shown in the tables are determined in accordance with the test specifications of the relevant DIN standards.

The tensile strength and elongation at break were determined in accordance with DIN 53 504.

The modulus at 100 and 300% elongation was determined in accordance with DIN 53 504.

The tear strength was determined by the method of Pohle (compare S. Boström, Kautschuk-Handbuch [Rubber Handbook], Volume 5, page 123).

The permanent elongation (tension set) was determined in accordance with DIN 53 518

The hardness (Shore A) was determined in accordance with DIN 53 505.

The rebound resilience (elasticity) was determined in accordance with 53 512.

The abrasion was determined in accordance with DIN 53 516.

The compression set was determined in accordance with DIN 53 517.

The vulcametry was carried out in accordance with DIN 53 529.

The service life in the fatigue test was determined by the method of S. Boström, Kautschuk-Handbuch [Rubber Handbook], Volume 5, Berliner Union, Stuttgart, 1962, pages 149–150.

Examples 1–23 according to the invention shown in Tables 2 and 4 demonstrate the advantage in aging stability of diene rubber vulcanizates compared with the prior art and also compared with compositions of Comparison Examples I to XI of Tables 3 and 4, which are not according to the invention.

Examples 1 and 2 represent a preferred vulcanization recipe with the base mixtures A (natural rubber) and B (cis-polyisoprene). The values after ageing for 14 days show that the residual elongation values (elongation at break of the vulcanizates after ageing for 14 days compared with the value of the non-aged vulcanizate) are still 73 and 78% respectively. In contrast, Comparison Example V (7 parts of BDBzTE in accordance with EP-0 432 417) has a residual elongation of only 62%. Above all, however, the slow vulcanization ($t_{90}$ value 26.9 minutes) of the comparison example manifests itself in a completely unacceptable value for the compression set both at 70° and at 100° C.

Even increasing the vulcanization temperature to 180° C. led to no improvement: the $t_{90}$ value was still 9.6 minutes, so that the vulcanization time of 10 minutes which is customary at this temperature would also be inadequate. The economic disadvantages and the risk of blooming at such high dosages of crosslinker substance in Comparison Example V have already been dealt with.

In Comparison Example IV, a natural rubber mixture is vulcanized with a conventional thiuram system. After ageing in a circulating air cabinet at 100° C. for 14 days, the disadvantages of thiuram vulcanization over the system according to the invention are clearly revealed: not only has the residual elongation fallen to 57% of the starting value; the tear strength according to Pohle (tear propagation resistance) has dropped sharply compared with the examples according to the invention. Damage to the vulcanizate can also be seen from the significantly reduced rebound resilience at 75° C.

An EV system shows similar disadvantages (Comparison Example II). Here also, the tear strength value, which has already dropped sharply after 7 days, and the rebound resilience at 75° C., which has fallen sharply after 14 days, very clearly demonstrate severe damage to the vulcanizate and therefore an inadequate ageing stability in comparison with the systems according to the invention.

A conventional sulfur accelerator system containing 0.6 part of sulfenamide accelerator and 2.5 parts of sulfur in a natural rubber mixture has been included as Comparison Example I in the table only for completeness: the values after ageing fall so extremely that practical use under exposure to heat cannot be considered at all.

However, the use of BDBzTE with a sulfenamide accelerator alone also does not achieve the aim, as Comparison Example III shows. Firstly, on the one hand, the vulcanization is even slower than with 7 parts of BDBzTE alone, which manifests itself in an unacceptable compression set value. After ageing for 14 days, however, the decreasing values for the hardness and rebound resilience and the increasing compression set compared with the values after ageing for 7 days show that here also significant degradation is progressing in the vulcanizate.

Comparison Example VII shows the effect of too high a dosage of an accelerator, which is demonstrated by the example of a base mixture based on a cis-polyisoprene with the accelerator zinc 2-mercaptobenzothiazole (ZMBT). After ageing at 100° C. for 14 days in a hot air cabinet, the severely reduced values of the tensile strength and tear strength according to Pohle show that the vulcanizate of this comparison example is distinctly less resistant to ageing than Example 3 according to the invention, which has a clearly better retention of the physical values such as tensile strength, elongation at break and compression set.

In addition to the preferred embodiments of the invention corresponding to the Examples 1 and 2 described, modified recipes in the context of the preconditions according to the invention also lead to results which are clearly superior to the prior art.

The vulcanization of cis-polyisoprene with 3 parts of BDBzTE and with 0.3 part of sulfur and 0.5 part of zinc 2-mercaptobenzothiazole (ZMBT) is described in Example 3. The improved ageing stability compared with Comparison Example VII has already been referred to above.

BDBzTH is employed as the crosslinking agent in Examples 4 and 5. The examples show that the same outstanding ageing stability can be achieved with this crosslinking agent as with the crosslinking agent BDBzTE. When the hot air ageing is extended from 7 to 14 days, the tear propagation resistance (structure according to Pohle) does not drop noticeably, while the rebound resilience at 75° C., which is still increasing over the same period, shows no damage at all to the elastomer network. This result can be achieved in cis-polyisoprene neither with sulfur donors nor with EV systems.

Examples 6 to 8 show the use of BDBzTE with smaller amounts of sulfur and 0.4 to 0.6 part of the sulfenamide accelerator TBBS. The vulcanization becomes somewhat slower as a result, but the compression set values both before and after ageing of the vulcanizates are clearly better than when the crosslinking agent alone is used, or with only the additional accelerator (Comparison Examples III and V). The values of the elongation at break after ageing at 100° C. for 14 days in relation to the starting values before ageing are exceptionally high particularly in Examples 6 and 7, at 80 and 74%, respectively. These examples show that an increase in the dosage of BDBzTE does not necessarily give better values in all criteria.

Examples 9 and 10 show the vulcanization of styrene-butadiene rubber (SBR) by 3 to 4 parts of the crosslinking agent BDBzTE and addition of 0.1 to 0.2 part of sulfur and 0.4 part of the additional accelerator TBBS. Outstanding abrasion and compression set values are achieved in both vulcanizates after ageing for 14 days, and in the recipe according to Example 10 a lower increase in hardness and higher residual elongation are also achieved.

These two examples show that in SBR, which is known to tend to harden under aerobic ageing, a lower dosage of sulfur and an amount of the crosslinking agent BDBzTE or BDBzTH tending towards the upper limit produce more favorable results if an increase in modulus which is as low as possible is sought.

Comparison Examples VIII to X illustrate the effects of a sulfur dosage in an SBR mixture which has been increased to 0.3 to 0.6 part, in comparison with Examples 9 and 10 (0.2 and 0.1 part of sulfur respectively), and in particular both with the additional accelerator TBBS (X:0.2 part) and without this (VIII and IX). After 14 days at 100° C., the residual elongations of the mixtures without an additional accelerator fall to only 18 to 27% of the starting value. In Comparison Example VIII also, the residual values for the tensile strength and elongation at break after ageing in a circulating air cabinet at 100° C. for 14 days are at a clearly lower level than in the case of Examples 9 and 10 according to the invention, so that the effectiveness of the process according to the invention is clearly demonstrated.

The effect of too high a sulfur dosage on a polyisoprene mixture is demonstrated in Comparison Example VI (the amount of additional accelerator TBBS was reduced from 0.4 to 0.2 part in order to achieve comparable moduli in the vulcanizates). If this example is compared with Example 2 according to the invention with 0.2 part of sulfur, it is striking that the elongation has already fallen to <300% (64% of the starting value, compared with 77% in Example 2) after ageing at 100° C. for 7 days. The tear strength is also lower from the beginning at a higher sulfur dosage.

While the level of properties in Example 2 has scarcely fallen further after 14 days at 100° C. compared with 7 days, a distinct further drop in the tensile strength, elongation and elasticity are found in Comparison Example VI, which indicates damage to the network. The system according to the invention thus acts on cispolyisoprene in the same way as on SBR.

Example 11 shows the vulcanization of a blend of natural rubber, cis-polybutadiene and SBR, such as is found in a tread mixture for winter tires, with the crosslinking system according to the invention. Here also, excellent retention of the compression set and the rebound resilience are to be observed.

In a further preferred embodiment, dibenzothiazyl disulfide (MBTS) is very advantageously used, either in combination with TBBS or alone. In this case, it is possible to shorten the vulcanization times even further. Thus, a polyisoprene mixture according to Examples 14 and 15 shows a $t_{90}$ value of only 14–15 minutes. At the same time, the dosage of BDBzTH can be lowered from 3.3 to 2.5 parts, without the modulus of the vulcanizate falling. Looking at the aging properties, it becomes clear that, in spite of the reduced amount of BDBzTH, outstanding values of structural strength, hardness and elasticity are obtained, similar to those in Examples 2 and 4.

However, the amount of this additional accelerator alone must not be kept too low. With only 0.8 part of MBTS (Comparison Example XI), an inadequate vulcanizate and unfavorable aging values after 14 days at 100° C. are obtained, and this manifests itself particularly in a low tear strength and rebound resilience and in higher heat build up in the service life fatigue test.

Examples 17–19 demonstrate the advantages of the process according to the invention in the use of MBTS as an additional accelerator of SBR. After aging for 14 days at 100° C., the tensile strength of the vulcanisate is still 20 MPa and the elongation at break of the same samples is still 380–500%, whereas only 6–11.8 MPa tensile strength and 69–196% elongation at break are obtained in comparison Examples VIII–X.

The process according to the invention is also particularly suitable for vulcanizing oil-extended rubbers. This is demonstrated by Examples 20 to 23. As can be seen from Table 4, good vulcanization states are obtained with a combination of TBBS and MBTS as additional accelerators (Example 20) or also with MBTS alone (Examples 21 to 22). The table also shows the excellent residual values for tensile strength, elongation at break, tear strength according to Pohle and compression set, and for the dynamic values coupled at the same time with only moderately increasing hardness, after 14 days aging at 100° C.

By contrast, only 6–11.8 MPa tensile strength and 69–196% elongation at break are obtained in Comparison Examples VIII–X.

Examples 1–23 demonstrate the advantages of the process according to the invention in comparison with Comparison Examples I to XI which are not according to the invention:

The use of only 2 to 4 parts of the crosslinker substances BDBzTE and BDBzTH according to the invention per 100 parts of rubber while simultaneously using 0.05 to 0.3, but preferably 0.1 to 0.2 part of sulphur and 0.3 to 2.5, but in particular 0.5 to 1.8 part of a mercapto accelerator, such as zinc 2-mercaptobenzothiazole (ZMBT), 2-mercaptobenzothiazole (MBT) or dibenzothiazyl disulfide (MBTS), or 0.1 to 0.8, preferably 0.3 to 0.5, part of a sulfenamide accelerator, such as N-tert-butyl-2-benzothiazylsulfenamide (TBBS), but amongst these preferably TBBS or ZMBT; furthermore, especially mixtures of 0.7 to 1.8 parts of a mercapto accelerator and 0.2 to 0.6 part of a sulfenamide accelerator, MBTS and TBBS being preferably used here.

Elastomers having a previously unachieved outstanding ageing resistance and reversion resistance are obtained after relatively short vulcanization times using economical amounts and avoiding blooming phenomena in the vulcanizate.

Obviously, numerous modifications and variations of the present invention are possible in light of the above teachings. It is therefore to be understood that, within the scope of the appended claims, the invention may be practiced otherwise than as specifically described herein.

TABLE 1

| BASE MIXTURE | A | B | C | D | E | F | G | H |
|---|---|---|---|---|---|---|---|---|
| NR (RSS # Defo 1000) | 100 | — | — | 50 | 100 | — | — | — |
| cis-IR[1] | — | 100 | — | — | — | 100 | — | — |
| E-SBR 1502[2] | — | — | 100 | 20 | — | — | 100 | — |
| E-SBR 1712[3] | — | — | — | — | — | — | — | 137.5 |
| BR[4] | — | — | — | 30 | — | — | — | — |
| ZnO RS | 3 | 3 | 3 | 3 | 3 | 3 | 3 | 3 |
| Stearic acid | 2 | 2 | 2 | 2 | 2 | 2 | 2 | 2 |
| IPPD[5] | 1 | 1 | 1 | 1 | 1 | 1 | 1 | 1 |
| 6PPD[6] | — | 1 | 1 | 1 | 1 | 1 | 1 | 1 |
| Koresin | 1 | 1 | 1 | — | — | — | — | — |
| Carbon black N-339 | 45 | 45 | 45 | 50 | 45 | 45 | 50 | 75 |
| HAR oil | — | — | — | 10 | — | — | 10 | 2 |

[1] NATSYN$^R$ 2200, Goodyear
[2] Styrene-butadiene copolymer, styrene content 23.5%, ML (1 + 4) 100° C. = 50, polymerized in aqueous emulsion, Hüls AG
[3] Styrene-butadiene copolymer, styrene content 23.5%, ML (1 + 4) 100° C. = 49, extended with 37.5 parts of highly aromatic oil, Hüls AG
[4] Cis-polybutadiene, cis-1,4 content at least 95%, ML (1 + 4) 100° C. = 46 ± 4, Hüls AG
[5] N-Isopropyl-N'-phenyl-p-phenylenediamine
[6] N-(1,3-Dimethylbutyl)-N'-phenyl-p-phenylenediamine

TABLE 2

| Base mixture | A | B | B | B | B | B | B | B | C | C | D |
|---|---|---|---|---|---|---|---|---|---|---|---|
| Sulphur | 0.2 | 0.2 | 0.3 | 0.2 | 0.1 | 0.1 | 0.1 | 0.05 | 0.2 | 0.1 | 0.2 |
| TBBS | 0.4 | 0.4 | — | 0.4 | 0.4 | 0.4 | 0.6 | 0.4 | 0.4 | 0.4 | 0.4 |
| ZMBT | — | — | 0.5 | — | — | — | — | — | — | — | — |
| BDBzTE | 3.0 | 3.0 | 3.0 | — | — | 3.0 | 3.0 | 4.0 | 3.0 | 4.0 | — |
| BDBzTH | — | — | — | 3.3 | 4.4 | — | — | — | — | — | 3.3 |
| Example | 1 | 2 | 3 | 4 | 5 | 6 | 7 | 8 | 9 | 10 | 11 |
| Vulcameter 150° C. | | | | | | | | | | | |
| t$_{10}$ min. | 8.7 | 8.6 | 6.9 | 9.5 | 12.0 | 9.9 | 9.4 | 10.2 | 11.7 | 11.7 | 9.2 |
| t$_{90}$ min. | 21.9 | 24.2 | 19.0 | 22.3 | 25.9 | 27.4 | 25.9 | 27.9 | 26.8 | 25.3 | 20.4 |
| Vulcanisation 30 minutes at 150° C. | | | | | | | | | | | |
| Tensile strength MPa | 23.2 | 21.0 | 18.7 | 22.2 | 20.1 | 19.2 | 20.8 | 19.0 | 20.4 | 17.3 | 18.2 |
| Elongation at break % | 516 | 545 | 466 | 582 | 566 | 534 | 591 | 567 | 559 | 492 | 482 |
| Modulus 100% MPa | 2.3 | 17 | 2.0 | 1.6 | 1.5 | 1.5 | 1.4 | 1.3 | 1.9 | 1.8 | 2.8 |
| Modulus 300% MPa | 12.5 | 9.2 | 10.5 | 9.0 | 8.5 | 8.6 | 7.8 | 7.6 | 9.5 | 9.4 | 10.0 |
| Tear strength according to Pohle N/mm | 87 | 71 | 76 | 81 | 85 | 73 | 75 | 82 | 31 | 40 | 56 |
| Hardness | | | | | | | | | | | |
| 22° C. Sh.A | 65 | 63 | 66 | 60 | 62 | 58 | 59 | 60 | 64 | 65 | 69 |
| 75° C. Sh.A | 55 | 53 | 57 | 51 | 51 | 48 | 49 | 50 | 56 | 55 | 59 |
| Elasticity | | | | | | | | | | | |
| 22° C. % | 47 | 47 | 48 | 48 | 45 | 47 | 48 | 45 | 46 | 46 | 40 |
| 75° C. % | 57 | 58 | 60 | 60 | 52 | 57 | 58 | 54 | 55 | 54 | 56 |
| Compression set | | | | | | | | | | | |
| 24 h/70° C. | 25 | 16 | 20 | 21 | 21 | 18 | 19 | 21 | 28 | 30 | 20 |
| 24 h/100° C. | 41 | 34 | 32 | 34 | 42 | 40 | 42 | 46 | 49 | 54 | — |
| DIN | 142 | 162 | 143 | 120 | — | 212 | 190 | 201 | 99 | 98 | 80 |

TABLE 2-continued

| Base mixture | A | B | B | B | B | B | B | B | C | C | D |
|---|---|---|---|---|---|---|---|---|---|---|---|
| Sulphur | 0.2 | 0.2 | 0.3 | 0.2 | 0.1 | 0.1 | 0.1 | 0.05 | 0.2 | 0.1 | 0.2 |
| TBBS | 0.4 | 0.4 | — | 0.4 | 0.4 | 0.4 | 0.6 | 0.4 | 0.4 | 0.4 | 0.4 |
| ZMBT | — | — | 0.5 | — | — | — | — | — | — | — | — |
| BDBzTE | 3.0 | 3.0 | 3.0 | — | — | 3.0 | 3.0 | 4.0 | 3.0 | 4.0 | — |
| BDBzTH | — | — | — | 3.3 | 4.4 | — | — | — | — | — | 3.3 |
| Example | 1 | 2 | 3 | 4 | 5 | 6 | 7 | 8 | 9 | 10 | 11 | abrasion mm$^3$

*after ageing for 7 days/100° C.*

| Vulcanisation for 30 minutes at 150° C. | | | | | | | | | | | |
|---|---|---|---|---|---|---|---|---|---|---|---|
| Tensile strength MPa | 17.8 | 18.4 | 17.3 | 21.5 | 19.4 | 18.8 | 19.5 | 16.5 | 19.8 | 18.8 | 13.5 |
| Elongation at break % | 375 | 425 | 363 | 474 | 429 | 470 | 474 | 408 | 499 | 353 | 322 |
| Modulus 100% MPa | 3.5 | 2.7 | 3.1 | 2.7 | 2.7 | 2.0 | 2.3 | 2.3 | 3.2 | 3.7 | 3.1 |
| Modulus 300% MPa | 15.2 | 13.0 | 15 | 13.1 | 13.3 | 10.9 | 11.6 | 11.9 | 15.4 | 16.7 | 12.9 |
| Tear strength according to Pohle N/mm | 51 | 56 | 50 | 66 | 71 | 66 | 63 | 65 | 28 | 34 | 58 |
| Hardness | | | | | | | | | | | |
| 22° C. Sh.A | 70 | 70 | 72 | 69 | 70 | 66 | 68 | 68 | 72 | 69 | 74 |
| 75° C. Sh.A | 62 | 59 | 64 | 59 | 61 | 57 | 58 | 59 | 63 | 62 | 66 |
| Elasticity | | | | | | | | | | | |
| 22° C. % | 52 | 52 | 54 | 52 | 52 | 51 | 49 | 51 | 49 | 52 | 41 |
| 75° C. % | 59 | 58 | 62 | 58 | 56 | 57 | 56 | 57 | 60 | 61 | 56 |
| Compression set | | | | | | | | | | | |
| 24 h/70° C. | 22 | 20 | 20 | 18 | 18 | 21 | 17 | 19 | 20 | 18 | 22 |
| 24 h/100° C. | 23 | 19 | 22 | 21 | 22 | 21 | 23 | 24 | 21 | 24 | — |
| DIN abrasion mm$^3$ | — | — | 171 | 191 | — | 160 | 262 | 168 | 126 | 121 | 112 |

*after ageing for 14 days/100° C.*

| Vulcanisation for 30 minutes at 150° C. | | | | | | | | | | | |
|---|---|---|---|---|---|---|---|---|---|---|---|
| Tensile strength MPa | 14.5 | 16.6 | 15.2 | 15.9 | 14.5 | 16.9 | 18.5 | 14.2 | 15.8 | 19.2 | 12.6 |
| Elongation at break % | 343 | 390 | 339 | 379 | 352 | 425 | 435 | 343 | 256 | 355 | 280 |
| Modulus 100% MPa | 3.1 | 2.8 | 3.3 | 2.6 | 2.8 | 2.3 | 2.6 | 2.8 | 5.2 | 3.9 | 4.0 |
| Modulus 300% MPa | 13.8 | 13.3 | 14.7 | 13.5 | 13.5 | 11.9 | 12.7 | 13.5 | — | 18 | — |
| Tear strength according to Pohle N/mm | 48 | 53 | 49 | 55 | 60 | 59 | 58 | 55 | 23 | 27 | 54 |
| Hardness | | | | | | | | | | | |
| 22° C. Sh.A | 69 | 69 | 72 | 69 | 72 | 66 | 66 | 68 | 74 | 73 | 76 |
| 75° C. Sh.A | 58 | 61 | 65 | 59 | 63 | 58 | 58 | 60 | 64 | 66 | 68 |
| Elasticity | | | | | | | | | | | |
| 22° C. % | 47 | 52 | 53 | 52 | 52 | 50 | 52 | 53 | 50 | 51 | 41 |
| 75° C. % | 57 | 58 | 61 | 60 | 57 | 57 | 58 | 58 | 59 | 59 | 57 |
| Compression set | | | | | | | | | | | |
| 24 h/70° C. | 29 | 21 | 19 | 26 | 22 | 20 | 20 | 21 | 19 | 18 | 22 |
| 24 h/100° C. | 35 | 25 | 25 | 24 | 25 | 24 | 26 | 23 | 24 | 21 | — |
| DIN abrasion mm$^3$ | — | — | 200 | 182 | — | 195 | 166 | 168 | 116 | 113 | 128 |

TABLE 3

| Base mixture | A | A | A | A | A | B | B | C | C | C |
|---|---|---|---|---|---|---|---|---|---|---|
| Sulphur | 2.5 | 0.4 | — | 0.6 | — | 0.5 | 0.1 | 0.3 | 0.5 | 0.6 |
| TBBS | 0.6 | 1.2 | 0.8 | 0.8 | — | 0.2 | — | — | — | 0.2 |
| ZMBT | — | — | — | — | — | — | 1.0 | — | — | — |
| TMTD 80% | — | — | — | 0.4 | — | — | — | — | — | — |
| BDBzTE | — | — | 3.0 | — | 7.0 | 3.0 | 3.0 | 3.0 | 3.0 | 3.0 |
| Comp. Example | I | II | III | IV | V | VI | VII | VIII | IX | X |
| Vulcameter 150° C. | | | | | | | | | | |
| t$_{10}$ min. | 6.8 | 8.4 | 11.6 | 4.5 | 10.0 | 7.7 | 6.5 | 14.3 | 13.0 | 10.6 |
| t$_{90}$ min. | 14.6 | 14.4 | 30.3 | 7.6 | 26.9 | 17.1 | 21.6 | 31.6 | 30.2 | 24.5 |
| Vulcanisation 30 minutes at 150° C. | | | | | | | | | | |
| Tensile strength MPa | 20.4 | 19.5 | 17.7 | 23.6 | 18.2 | 16.7 | 19.4 | 17.2 | 14.8 | 14.3 |
| Elongation at break % | 512 | 528 | 561 | 568 | 461 | 417 | 583 | 492 | 377 | 346 |
| Modulus | 2.0 | 1.5 | 1.3 | 1.8 | 1.9 | 2.2 | 1.4 | 2 | 2.5 | 2.5 |

TABLE 3-continued

| Base mixture | A | A | A | A | A | B | B | C | C | C |
|---|---|---|---|---|---|---|---|---|---|---|
| Sulphur | 2.5 | 0.4 | — | 0.6 | — | 0.5 | 0.1 | 0.3 | 0.5 | 0.6 |
| TBBS | 0.6 | 1.2 | 0.8 | 0.8 | — | 0.2 | — | — | — | 0.2 |
| ZMBT | — | — | — | — | — | — | 1.0 | — | — | — |
| TMTD 80% | — | — | — | 0.4 | — | — | — | — | — | — |
| BDBzTE | — | — | 3.0 | — | 7.0 | 3.0 | 3.0 | 3.0 | 3.0 | 3.0 |
| Comp. Example | I | II | III | IV | V | VI | VII | VIII | IX | X |
| 100% MPa Modulus | 9.8 | 9.2 | 7.8 | 10.8 | 10.9 | 11.5 | 7.2 | 9.7 | 12.2 | 13.3 |
| 300% MPa | | | | | | | | | | |
| Tear strength according to Pohle N/mm | 67 | 66 | 57 | 74 | 44 | 69 | 62 | 33 | 29 | 32 |
| Hardness | | | | | | | | | | |
| 22° C. Sh.A | 58 | 55 | 57 | 59 | 67 | 67 | 60 | 65 | 68 | 67 |
| 75° C. Sh.A | 48 | 44 | 40 | 48 | 53 | 59 | 50 | 54 | 59 | 59 |
| Elasticity | | | | | | | | | | |
| 22° C. % | 50 | 50 | 45 | 52 | 39 | 48 | 47 | 48 | 46 | 48 |
| 75° C. % | 59 | 58 | 50 | 59 | 50 | 60 | 58 | 55 | 57 | 59 |
| Compression set | | | | | | | | | | |
| 24 h/70° C. | 26 | 36 | 53 | 28 | 46 | 16 | 21 | 33 | 25 | 20 |
| 24 h/100° C. | — | — | — | — | 59 | 28 | 40 | 56 | 44 | 36 |
| DIN abrasion mm³ | 105 | — | — | — | — | — | 187 | — | — | 108 |
| after ageing for 7 days/100° C. | | | | | | | | | | |
| Vulcanisation 30 minutes at 150° C. | | | | | | | | | | |
| Tensile strength MPa | 13.5 | 11.1 | 19.1 | 11.7 | 11.8 | 11.3 | 19.0 | 18.0 | 13.9 | 12.6 |
| Elongation at break % | 272 | 391 | 466 | 353 | 279 | 269 | 469 | 345 | 251 | 216 |
| Modulus 100% MPa | 3.2 | 1.9 | 2.7 | 2.4 | 3.3 | 3.2 | 2.3 | 3.6 | 4.3 | 4.8 |
| Modulus 300% MPa | — | 8.2 | 12.4 | 10.7 | — | — | 11.2 | 16.7 | — | — |
| Tear strength according to Pohle N/mm | 42 | 13 | 62 | 35 | 52 | 42 | 62 | 31 | 24 | 27 |
| Hardness | | | | | | | | | | |
| 22° C. Sh.A | 67 | 61 | 67 | 63 | 70 | 70 | 68 | 69 | 74 | 73 |
| 75° C. Sh.A | 57 | 49 | 57 | 50 | 62 | 63 | 58 | 64 | 66 | 66 |
| Elasticity | | | | | | | | | | |
| 22° C. % | 50 | 46 | 50 | 48 | 49 | 56 | 53 | 49 | 50 | 51 |
| 75° C. % | 56 | 60 | 55 | 53 | 54 | 62 | 60 | 61 | 63 | 62 |
| Compression set | | | | | | | | | | |
| 24 h/70° C. | 24 | 28 | 24 | 26 | 22 | 22 | 25 | 17 | 15 | 20 |
| 24 h/100° C. | — | — | — | — | 26 | 20 | 30 | 23 | 17 | 16 |
| DIN abrasion mm³ | 214 | — | — | — | 177 | — | 199 | 108 | 122 | 122 |
| after ageing for 14 days at 100° C. | | | | | | | | | | |
| Vulcanisation 30 minutes at 150° C. | | | | | | | | | | |
| Tensile strength MPa | 3.4 | 6.6 | 16.2 | 9.6 | 11.3 | 9.8 | 5.9 | 9.2 | 6.0 | 11.8 |
| Elongation at break % | 58 | 311 | 429 | 323 | 284 | 234 | 265 | 132 | 69 | 196 |
| Modulus 100% MPa | — | 1.7 | 2.5 | 2.1 | 3.1 | 3.1 | 1.9 | 7.3 | — | 5.2 |
| Modulus 300% MPa | — | 6.5 | 11.8 | 9.5 | — | — | — | — | — | — |
| Tear strength according to Pohle N/mm | 11 | 12 | 53 | 15 | 51 | 39 | 33 | 21 | 16 | 25 |
| Hardness | | | | | | | | | | |
| 22° C. Sh.A | 73 | 60 | 64 | 62 | 72 | 71 | 67 | 73 | 76 | 83 |
| 75° C. Sh.A | 63 | 47 | 54 | 50 | 64 | 63 | 58 | 65 | 68 | 74 |
| Elasticity | | | | | | | | | | |
| 22° C. % | 43 | 42 | 43 | 38 | 49 | 53 | 51 | 51 | 50 | 52 |
| 75° C. % | 53 | 45 | 49 | 45 | 58 | 58 | 58 | 60 | 60 | 61 |
| Compression set | | | | | | | | | | |
| 24 h/70° C. | 28 | 40 | 35 | 37 | 23 | 24 | 24 | 15 | 18 | 19 |
| 24 h/100° C. | — | — | — | — | 33 | 29 | 37 | 21 | 25 | 20 |
| DIN abrasion mm³ | 265 | — | — | — | — | — | 190 | 113 | 118 | 172 |

TABLE 4

| | Base Mixture E: | | |
|---|---|---|---|
| Recipe | 12 | 13 | XI |

TABLE 4-continued

|  |  |  |  |
|---|---|---|---|
| Sulphur | 0.2 | 0.2 | 0.2 |
| TBBS | 0.4 | 0.0 | 0.0 |
| MBTS | 1.0 | 1.5 | 0.0 |
| BDBzTH | 2.5 | 2.5 | 3.5 |
| Vulcameter 150° C., |  |  |  |
| $t_{10}$ min. | 4.8 | 4.1 | 11 |
| $t_{90}$ min. | 14.2 | 13.2 | 25.6 |
| Vulcameter 180° C., |  |  |  |
| $t_{10}$ min. | 1.6 | 1.4 | 2.5 |
| $t_{90}$ min. | 3.4 | 3.1 | 4.4 |
| Vulcanisation at 180° C. min | 10 | 10 | 10 |
| Tensile strength Mpa | 23.1 | 25.1 | 22 |
| Elongation at break % | 512 | 519 | 529 |
| Modulus at 100% elongation Mpa | 2.1 | 2.2 | 1.9 |
| Modulus at 300% elongation Mpa | 12.7 | 13.4 | 11.1 |
| Tear strength according to Pohle N/mm | 77 | 81 | 70 |
| Tension set % | 10 | 10 | 12 |
| Hardness 22° C. Shore A | 64 | 63 | 62 |
| Hardness 75° C. Shore A | 54 | 53 | 52 |
| Elasticity 22° C. % | 48 | 51 | 45 |
| Elasticity 75° C. % | 59 | 62 | 54 |
| Compression set 24 h/70° C. % | 17 | 17 | 25 |
| Compression set 24 h/100° C. % | 33 | 31 | 35 |
| DIN abrasion mm³ | 160 | 147 | 176 |
| Vulcanisation at 180° C. min | 20 | 20 | 20 |
| Fatigue test |  |  |  |
| 150 N °C. | 106 | 101 | 159 |
| 200 N °C. | 146 | 139 | 12' |
| 250 N °C. | 14.8' | 14.8' |  |
| Goodrich Method 5° C. | 32 | 34 | deformation too high |
| Deformation % | −0.8 | −1.5 |  |
| Ageing for 7 days at 100° C. |  |  |  |
| Tensile strength Mpa | 20.1 | 20.5 | 16.9 |
| Elongation at break % | 421 | 412 | 405 |
| Modulus at 100% elongation MPa | 2.7 | 3 | 2.6 |
| Modulus at 300% elongation MPa | 14.5 | 15.5 | 12.9 |
| Tear strength according to Pohle N/mm | 70 | 68 | 25 |
| Tension set % | 6 | 8 | 8 |
| Hardness 22° C. Shore A | 67 | 68 | 69 |
| Hardness 75° C. Shore A | 58 | 58 | 57 |
| Elasticity 22° C. % | 49 | 51 | 47 |
| Elasticity 75° C. % | 59 | 61 | 52 |
| Compression set 24 h/70° C. % | 14 | 12 | 21 |
| Compression set 24 h/100° C. % | 25 | 23 | 24 |
| DIN abrasion mm³ | 161 | 160 | 171 |
| Fatigue test |  |  |  |
| 150 N °C. | 88 | 79 | 104 |
| 200 N °C. | 118 | 108 | 144 |
| 250 N °C. | 139 | 126 | 186 |
| 300 N °C. | 159 | 150 | 6' |
| 350 N °C. | 13' | 179 |  |
| 400 N °C. |  | 8' |  |
| Ageing for 14 days at 100° C. |  |  |  |
| Tensile strength Mpa | 20.2 | 18.8 | 10.2 |
| Elongation at break % | 429 | 406 | 350 |
| Modulus at 100% elongation MPa | 2.9 | 2.9 | 2 |
| Modulus at 300% elongation MPa | 14.5 | 14.9 | 9.3 |
| Tear strength according to Pohle N/mm | 61 | 60 | 13 |
| Tension set % | 10 | 11 | 10 |
| Hardness 22° C. Shore A | 66 | 66 | 65 |
| Hardness 75° C. Shore A | 57 | 56 | 49 |
| Elasticity 22° C. % | 49 | 52 | 42 |
| Elasticity 75° C. % | 56 | 59 | 46 |
| Compression set 24 h/70° C. % | 22 | 20 | 33 |
| Compression set 24 h/100° C. % | 35 | 34 | 40 |
| DIN abrasion mm³ | 175 | 169 | 234 |
| Fatigue test |  |  |  |
| 150 N °C. | 82 | 81 | 104 |
| 200 N °C. | 114 | 111 | 140 |
| 250 N °C. | 137 | 132 | 175 |
| 300 N °C. | 159 | 154 | 8' |
| 350 N °C. | 187 | 177 |  |
| 400 N °C. | 5' | 5' |  |

| | Base Mixture F: | | | |
|---|---|---|---|---|
| Recipe | 14 | 15 | 16 | XI |
| Sulphur | 0.2 | 0.2 | 0.1 | 0.2 |
| TBBS | 0.4 | 0.0 | 0.0 | 0.0 |
| MBTS | 1.0 | 1.5 | 1.5 | 0.8 |

TABLE 4-continued

| | | | | |
|---|---|---|---|---|
| BDBzTH | 2.5 | 2.5 | 3.5 | 3.5 |
| Vulcameter 150° C., | | | | |
| $t_{10}$ min. | 4.4 | 4.1 | 5 | 10.5 |
| $t_{90}$ min. | 15.3 | 14.5 | 19.5 | 22.6 |
| Vulcameter 180° C., | | | | |
| $t_{10}$ min. | 1.4 | 1.3 | 1.7 | 2.5 |
| $t_{90}$ min. | 3.8 | 3.7 | 4.4 | 4.5 |
| Vulcanisation at 180° C. min | 10 | 10 | 10 | 10 |
| Tensile strength Mpa | 22.6 | 21.2 | 21.4 | 20.4 |
| Elongation at break % | 556 | 522 | 559 | 584 |
| Modulus at 100% elongation | 1.8 | 1.8 | 1.7 | 1.4 |
| Modulus at 300% elongation | 10.2 | 10.1 | 9.1 | 7.9 |
| Tear strength according to Pohle N/mm | 63 | 74 | 65 | 62 |
| Tension set % | 10 | 10 | 10 | 10 |
| Hardness 22° C. Shore A | 62 | 61 | 62 | 56 |
| Hardness 75° C. Shore A | 52 | 52 | 51 | 48 |
| Elasticity 22° C. % | 48 | 49 | 47 | 46 |
| Elasticity 75° C. % | 60 | 60 | 57 | 57 |
| Compression set 24 h/70° C. % | 12 | 12 | 15 | 17 |
| Compression set 24 h/100° C. % | 25 | 24 | 31 | 27 |
| DIN abrasion mm$^3$ | 158 | 162 | 169 | 164 |
| Vulcanisation at 180° C. min | 20 | 20 | 20 | 20 |
| Fatigue test | | | | |
| 150 N °C. | 101 | 100 | 109 | 120 |
| 200 N °C. | 127 | 129 | 133 | 158 |
| 250 N °C. | 151 | 159 | 176 | 11' |
| Goodrich Method 5° C. | 29 | 29 | 30 | 38 |
| Ageing for 7 days at 100° C. | | | | |
| Tensile strength MPa | 21.3 | 20.5 | 19.3 | 20.2 |
| Elongation at break % | 487 | 463 | 441 | 494 |
| Modulus at 100% elongation MPa | 2.5 | 2.5 | 2.5 | 2.2 |
| Modulus at 300% elongation MPa | 12.5 | 12.8 | 12.8 | 11.1 |
| Tear strength according to Pohle N/mm | 64 | 69 | 63 | 65 |
| Tension set % | 10 | 8 | 7 | 10 |
| Hardness 22° C. Shore A | 68 | 68 | 67 | 66 |
| Hardness 75° C. Shore A | 58 | 60 | 59 | 57 |
| Elasticity 22° C. % | 50 | 52 | 52 | 58 |
| Elasticity 75° C. % | 59 | 61 | 60 | 54 |
| Compression set 24 h/70° C. % | 15 | 14 | 11 | 18 |
| Compression set 24 h/100° C. % | 23 | 23 | 22 | 24 |
| DIN abrasion mm$^3$ | 168 | 173 | 173 | 183 |
| Fatigue test | | | | |
| 150 N °C. | 89 | 89 | 101 | 105 |
| 200 N °C. | 117 | 117 | 127 | 138 |
| 250 N °C. | 136 | 137 | 147 | 157 |
| 300 N °C. | 157 | 156 | 169 | 14.8' |
| 350 N °C. | 189 | 168 | 9' | |
| 400 N °C. | 5' | 5' | | |
| Goodrich Method 5° C. | 37 | 34 | 35 | 43 |
| Deformation % | 0.6 | ±0.0 | −0.5 | −1.2 |
| Ageing for 14 days at 100° C. | | | | |
| Tensile strength MPa | 18.3 | 21.2 | 20.1 | 18.6 |
| Elongation at break % | 439 | 478 | 461 | 474 |
| Modulus at 100% elongation MPa | 2.6 | 2.5 | 2.6 | 2.3 |
| Modulus at 300% elongation MPa | 12.3 | 12.5 | 12.7 | 11.1 |
| Tear strength according to Pohle N/mm | 51 | 48 | 54 | 27 |
| Tension set % | 9 | 10 | 9 | 10 |
| Hardness 22° C. Shore A | 66 | 70 | 68 | 64 |
| Hardness 75° C. Shore A | 58 | 59 | 60 | 55 |
| Elasticity 22° C. % | 50 | 50 | 40 | 48 |
| Elasticity 75° C. % | 59 | 57 | 59 | 52 |
| Compression set 24 h/70° C. % | 21 | 23 | 19 | 24 |
| Compression set 24 h/100° C. % | 32 | 31 | 33 | 33 |
| DIN abrasion mm$^3$ | 177 | 178 | 177 | 199 |
| Fatigue test | | | | |
| 150 N °C. | 89 | 90 | 921 | 104 |
| 200 N °C. | 117 | 120 | 125 | 135 |
| 250 N °C. | 138 | 139 | 143 | 160 |
| 300 N °C. | 158 | 157 | 157 | 14.8' |
| 350 N °C. | 188 | 178 | 14.8' | |
| 400 N °C. | 7' | 7' | | |
| Goodrich Method 5° C. | 41 | 39 | 41 | 54 |
| Deformation % | −2.1 | −1.6 | −2.1 | −0.9 |

| | Base Mixture G: | | |
|---|---|---|---|
| Recipe | 17 | 18 | 19 |
| Sulphur | 0.2 | 0.1 | 0.2 |
| TBBS | 0.0 | 0.4 | 0.4 |
| MBTS | 1.5 | 1.5 | 1.5 |
| BDBzTH | 3.0 | 3.5 | 2.0 |

TABLE 4-continued

| | | | |
|---|---|---|---|
| Vulcameter 150° C., | | | |
| $t_{10}$ min. | 9.8 | 10.9 | 9.5 |
| $t_{90}$ min. | 23.8 | 25.8 | 22.1 |
| Vulcameter 180° C., | | | |
| $t_{10}$ min. | 2.5 | 2.7 | 2.4 |
| $t_{90}$ min. | 5 | 5.8 | 5.1 |
| Vulcanisation at 180° C. min | 10 | 10 | 10 |
| Tensile strength MPa | 20.3 | 22.9 | 22.5 |
| Elongation at break % | 535 | 590 | 632 |
| Modulus at 100% elongation Mpa | 2 | 1.9 1.7 | |
| Modulus at 300% elongation Mpa | 10.4 | 9.9 | 8.8 |
| Tear strength according to Pohle N/mm | 43 | 46 | 48 |
| Tension set % | 10 | 11 | 13 |
| Hardness 22° C. Shore A | 63 | 62 | 62 |
| Hardness 75° C. Shore A | 55 | 53 | 52 |
| Elasticity 22° C. % | 43 | 43 | 43 |
| Elasticity 75° C. % | 55 | 53 | 52 |
| Compression set 24 h/70° C. % | 17 | 20 | 19 |
| Compression set 24 h/100° C. % | 34 | 43 | 36 |
| DIN abrasion mm$^3$ | 112 | 115 | 115 |
| Vulcanisation at 180° C. min | 20 | 20 | 20 |
| Fatigue test | | | |
| 150 N °C. | 98 | 103 | 112 |
| 200 N °C. | 126 | 155 | 187 |
| 250 N °C. | 151 | 155 | 187 |
| 300 N °C. | 175 | 178 | 187 |
| 350 N °C. | 7' | 10' | 6' |
| Goodrich Method 5° C. | 44 | 47 | 55 |
| Deformation % | −0.8 | −1.9 | −1.8 |
| Ageing for 7 days at 100° C. | | | |
| Tensile strength MPa | 21.2 | 20.6 | 22.2 |
| Elongation at break % | 447 | 465 | 556 |
| Modulus at 100% elongation MPa | 2.8 | 2.9 | 2.4 |
| Modulus at 300% elongation MPa | 14.2 | 14.4 | 11.8 |
| Tear strength according to Pohle N/mm | 36 | 36 | 43 |
| Tension set % | 7 | 7 | 11 |
| Hardness 22° C. Shore A | 67 | 66 | 64 |
| Hardness 75° C. Shore A | 59 | 59 | 56 |
| Elasticity 22° C. % | 47 | 47 | 46 |
| Elasticity 75° C. % | 57 | 57 | 54 |
| Compression set 24 h/70° C. % | 12 | 12 | 14 |
| Compression set 24 h/100° C. % | 21 | 24 | 22 |
| DIN abrasion mm$^3$ | 122 | 120 | 117 |
| Fatigue test | | | |
| 150 N °C. | 89 | 94 | 100 |
| 200 N °C. | 119 | 119 | 132 |
| 250 N °C. | 138 | 146 | 159 |
| 300 N °C. | 158 | 169 | 183 |
| 350 N °C. | 181 | 14' | 8' |
| 400 N °C. | 6' | | |
| Goodrich Method 5° C. | 44 | 43 | 53 |
| Deformation % | 0.8 | 1 | −0.8 |
| Ageing for 14 days at 100° C. | | | |
| Tensile strength MPa | 19.5 | 20.4 | 21.4 |
| Elongation at break % | 382 | 401 | 496 |
| Modulus at 100% elongation MPa | 3.5 | 3.4 | 2.9 |
| Modulus at 300% elongation MPa | 16.3 | 15.9 | 13.2 |
| Tear strength according to Pohle N/mm | 32 | 30 | 35 |
| Tension set % | 6 | 6 | 10 |
| Hardness 22° C. Shore A | 72 | 72 | 71 |
| Hardness 75° C. Shore A | 63 | 63 | 61 |
| Elasticity 22° C. % | 46 | 46 | 45 |
| Elasticity 75° C. % | 56 | 56 | 52 |
| Compression set 24 h/70° C. % | 14 | 13 | 18 |
| Compression set 24 h/100° C. % | 18 | 21 | 24 |
| DIN abrasion mm$^3$ | 125 | 131 | 123 |
| Fatigue test | | | |
| 150 N °C. | 92 | 96 | 102 |
| 200 N °C. | 120 | 123 | 135 |
| 250 N °C. | 140 | 145 | 156 |
| 300 N °C. | 160 | 164 | 180 |
| 350 N °C. | 184 | 188 | 11.5' |
| 400 N °C. | 6.5' | 3' | |
| Goodrich Method 5° C. | 42 | 44 | 55 |
| Deformation % | −1.0 | −0.7 | −4.1 |

| | Base Mixture H: | | | |
|---|---|---|---|---|
| Recipe | 20 | 21 | 22 | 23 |
| Sulphur | 0.2 | 0.2 | 0.3 | 0.2 |
| TBBS | 0.4 | 0.0 | 0.0 | 0.4 |

TABLE 4-continued

| | | | | |
|---|---|---|---|---|
| MBTS | 0.8 | 1.5 | 1.5 | 1.0 |
| BDBzTH | 4.0 | 4.0 | 3.5 | 3.5 |
| Vulcameter 150° C., | | | | |
| $t_{10}$ min. | 12 | 10.9 | 10.3 | 11.8 |
| $t_{90}$ min. | 26.2 | 25.5 | 22.3 | 24.3 |
| Vulcameter 180° C., | | | | |
| $t_{10}$ min. | 2.8 | 2.5 | 2.3 | 2.6 |
| $t_{90}$ min. | 5 | 5 | 4.6 | 4.8 |
| Vulcanisation at 180° C. min | 10 | 10 | 10 | 10 |
| Tensile strength MPa | 19.5 | 19 | 18.6 | 19 |
| Elongation at break % | 510 | 518 | 489 | 531 |
| Modulus at 100% elongation MPa | 2.1 | 2 | 2.2 | 1.9 |
| Modulus at 300% elongation MPa | 11.3 | 10.7 | 11.6 | 10.6 |
| Tear strength according to Pohle N/mm | 36 | 37 | 37 | 41 |
| Tension set % | 11 | 11 | 11 | 11 |
| Hardness 22° C. Shore A | 63 | 63 | 65 | 61 |
| Hardness 75° C. Shore A | 53 | 54 | 56 | 52 |
| Elasticity 22° C. % | 33 | 33 | 32 | 33 |
| Elasticity 75° C. % | 51 | 49 | 48 | 49 |
| Compression set 24 h/70° C. % | 16 | 17 | 14 | 18 |
| Compression set 24 h/100° C. % | 33 | 34 | 30 | 33 |
| DIN abrasion mm$^3$ | 108 | 111 | 124 | 116 |
| Vulcanisation at 180° C. min | 20 | 20 | 20 | 20 |
| Fatigue test | | | | |
| 150 N °C. | 105 | 110 | 109 | 114 |
| 200 N °C. | 140 | 144 | 141 | 154 |
| 250 N °C. | 166 | 181 | 176 | 189 |
| 300 N °C. | 14.8' | 7' | 10' | 5' |
| Goodrich Method 5° C. | 51 | 49 | 47 | 51 |
| Deformation % | −1.2 | −0.4 | 0.4 | −1.3 |
| Ageing for 7 days at 100° C. | | | | |
| Tensile strength MPa | 18.2 | 17.7 | 17.3 | 18 |
| Elongation at break % | 426 | 424 | 394 | 462 |
| Modulus at 100% elongation MPa | 3 | 3.1 | 3.3 | 2.9 |
| Modulus at 300% elongation MPa | 13.8 | 13.9 | 14.4 | 13 |
| Tear strength according to Pohle N/mm | 36 | 34 | 35 | 39 |
| Tension set % | 11 | 11 | 10 | 15 |
| Hardness 22° C. Shore A | 66 | 66 | 66 | 66 |
| Hardness 75° C. Shore A | 57 | 57 | 57 | 57 |
| Elasticity 22° C. % | 36 | 36 | 36 | 36 |
| Elasticity 75° C. % | 49 | 49 | 50 | 46 |
| Compression set 24 h/70° C. % | 15 | 13 | 13 | 15 |
| Compression set 24 h/100° C. % | 23 | 22 | 20 | 23 |
| DIN abrasion mm$^3$ | 138 | 126 | 134 | 135 |
| Fatigue test | | | | |
| 150 N °C. | 103 | 102 | 99 | 106 |
| 200 N °C. | 138 | 133 | 132 | 135 |
| 250 N °C. | 159 | 155 | 156 | 161 |
| 300 N °C. | 14' | 178 | 178 | 192 |
| 350 N °C. | | 12' | 14.8' | 5' |
| Goodrich Method 5° C. | 55 | 50 | 50 | 55 |
| Deformation % | −0.6 | −0.7 | −0.2 | −1.2 |
| Ageing for 14 days at 100° C. | | | | |
| Tensile strength MPa | 17.9 | 18 | 17.1 | 17.5 |
| Elongation at break % | 424 | 411 | 381 | 446 |
| Modulus at 100% elongation MPa | 3.5 | 3.6 | 3.7 | 3.2 |
| Modulus at 300% elongation MPa | 14.1 | 14.6 | 14.8 | 13.1 |
| Tear strength according to Pohle N/mm | 34 | 33 | 32 | 34 |
| Tension set % | 12 | 10 | 10 | 14 |
| Hardness 22° C. Shore A | 71 | 72 | 73 | 72 |
| Hardness 75° C. Shore A | 60 | 61 | 61 | 60 |
| Elasticity 22° C. % | 35 | 36 | 36 | 35 |
| Elasticity 75° C. % | 47 | 48 | 48 | 46 |
| Compression set 24 h/70° C. % | 17 | 16 | 16 | 19 |
| Compression set 24 h/100° C. % | 24 | 25 | 23 | 26 |
| DIN abrasion mm$^3$ | 139 | 147 | 156 | 151 |
| Fatigue test | | | | |
| 150 N °C. | 104 | 110 | 106 | 106 |
| 200 N °C. | 134 | 134 | 137 | 144 |
| 250 N °C. | 160 | 156 | 159 | 167 |
| 300 N °C. | 187 | 182 | 186 | 194 |
| 350 N °C. | 7' | 11.5' | 4' | 2' |
| Goodrich Method 5° C. | 57 | 53 | 53 | 57 |
| Deformation % | −2.5 | −2.3 | −2.4 | −3.3 |

': Time interval (minutes) for the destruction of the ball fatigue under the condition mentioned in the table.

What is claimed as new and desired to be secured by Letters Patent of the United States is:

a) 1 to 4.5 parts of a cross linker of the formula

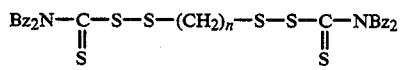

wherein n is 2 or 6 and Bz is benzyl;
(b) 0.05 to 0.3 parts of sulfur; and
(c) 0.3 to 2.5 parts of a mercapto accelerator and 0.1 to 0.8 parts of a sulfenamide accelerator, wherein the mercapto accelerator is zinc 2-mercaptobenzothiazole, 2-mercaptobenzothiazole or dibenzylthiazyl disulfide, and the sulfenamide accelerator is N-tert.butyl-2-benzothiazylsulfenamide, and
wherein all parts are relative to 100 parts of said diene rubber.

2. The vulcanized rubber of claim 1, wherein said vulcanizing is carried out in the presence of:
(a) 2 to 4 parts of said crosslinker;
(b) 0.1 to 2 parts of sulphur; and
(c) 0.6 to 1.5 parts of said mercapto accelerator and 0.2 to 0.6 part of said sulfenamide accelerator.

3. The vulcanized rubber of claim 1, wherein said diene rubber is selected from the group consisting of natural rubber, cis-polyisoprene, cis-polybutadiene, emulsion SBR, solution SBR, vinyl-polybutadiene, vinyl-SBR, 3,4-polyisoprene, nitrile rubber, polyoctenamer, and mixtures thereof.

4. The vulcanized rubber of claim 2, wherein said diene rubber is selected from the group consisting of natural rubber, cis-polyisoprene, cis-polybutadiene, emulsion SBR, solution SBR, vinyl-polybutadiene, vinyl-SBR, 3,4-polyisoprene, nitrile rubber, polyoctenamer, and mixtures thereof.

5. The vulcanized rubber of claim 3, wherein said diene rubber is oil-extended.

6. The vulcanized rubber of claim 4, wherein said diene rubber is oil-extended.

* * * * *